UNITED STATES PATENT OFFICE.

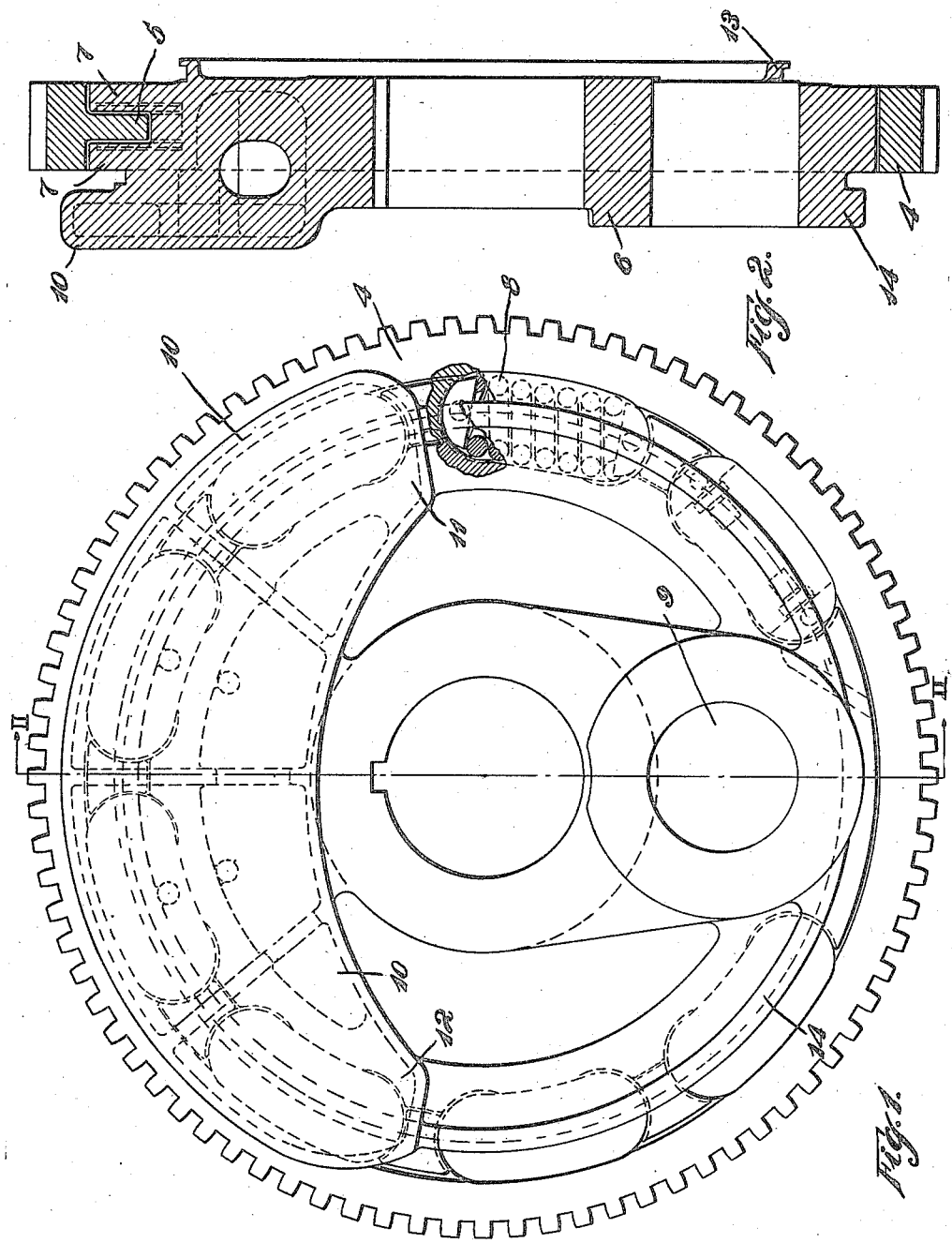

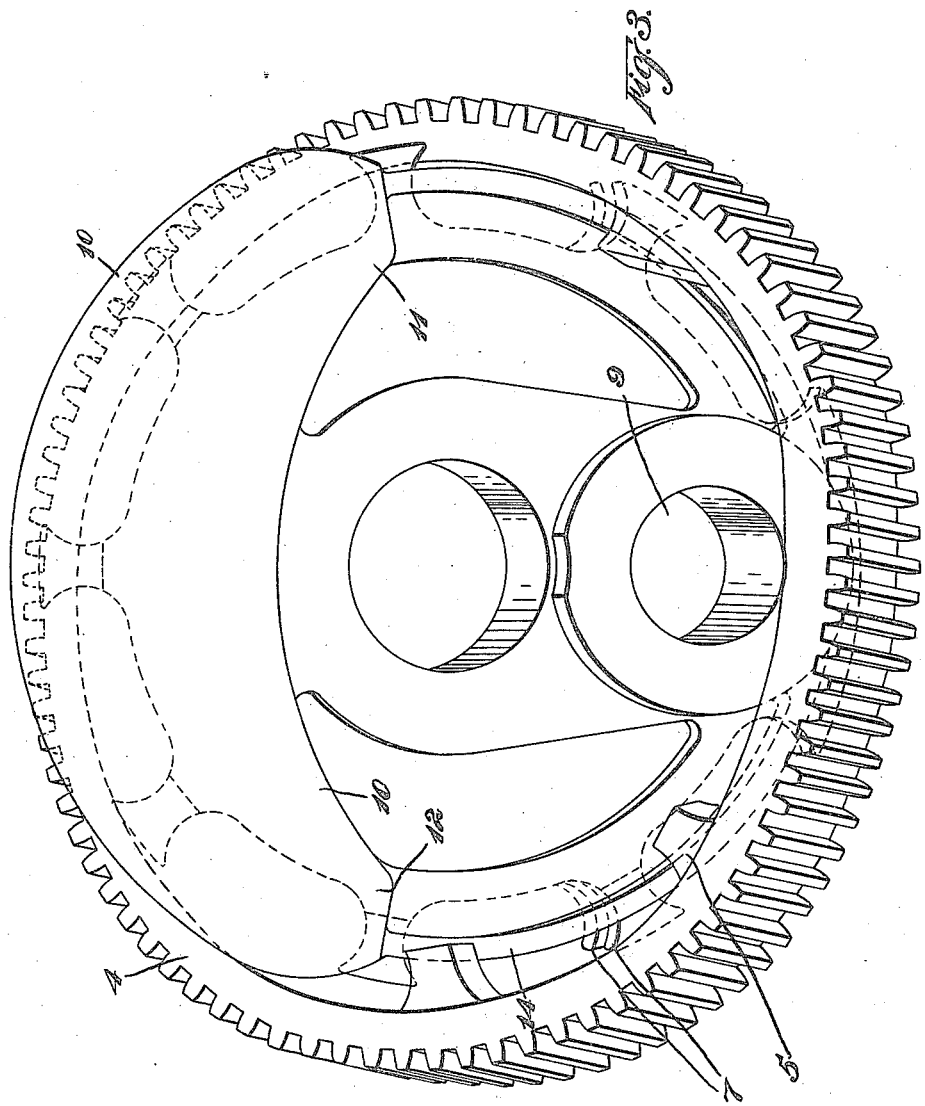

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

GEAR WHEEL.

1,424,240.     Specification of Letters Patent.     Patented Aug. 1, 1922.

Application filed January 6, 1921. Serial No. 435,323.

*To all whom it may concern:*

Be it known that I, GEORGE M. EATON, a citizen of the United States, and a resident of Pittsburgh, in the county of Allegheny and State of Pennsylvania, have invented a new and useful Improvement in Gear Wheels, of which the following is a specification.

My invention relates to gear wheels and particularly to those of the flexible or resilient type wherein the hub or gear center drives the gear rim through the medium of springs.

My invention has for its object the provision of a two-part gear wheel wherein the counter-balance may be of such size that it extends radially into the circumferential zone of the gear rim and which may still be made integral with the gear center without interfering with the placing or removal of the gear rim.

Heretofore, in the construction of flexible gears, of the type commonly employed on electric locomotives and which are connected to the locomotive driving wheels by a crank or side rod, it has been customary to provide a detachable counter-balance. This arrangement has been necessary by reason of the fact that, if the counter-balance were sufficiently heavy to function properly, it was of such size that it extended beyond the radial limits of the gear center. In order to permit removal of the gear rim, it was necessary to fasten the counter-balance to the gear center by means of bolts, so that it could be taken off to permit removal of the gear rim.

By employing my construction, it is possible to make the counter-balance of sufficient weight and yet form it integrally with the gear center in such manner that the gear rim may be removed easily.

My device is illustrated in a preferred form in the accompanying drawings, wherein—

Figure 1 is a view, in side elevation but partially in section, of a gear wheel constructed in accordance with my invention;

Fig. 2 is a sectional view taken along the line II—II of Fig. 1, and

Fig. 3 is a view similar to that of Fig. 1, showing the gear rim partially removed from its center.

The construction includes a toothed gear rim 4, having inwardly extending lugs 5, and a hub or gear center 6 having outwardly extending lugs 7 which are in axial alinement with the lugs 5. A series of spring elements 8 are interposed between adjacent lugs to secure the desired resiliency between the driving and driven element, as, for example, in the manner shown in Patent No. 1,321,511, issued on November 11, 1919, to my assignee, the Westinghouse Electric & Manufacturing Company.

The gear center is carried on a jack shaft in the usual manner and has a crank-pin hole 9 adjacent to one edge thereof, and, adjacent its opposite edge, it carries the counter-balance 10. It will be seen that the counter-balance 10 extends radially substantially to the periphery of the gear rim but that the outer edges of its ends 11 and 12 are of less distance apart than the inner diameter of the gear rim.

The gear center is provided with flanges 13 and 14 (Fig. 2) having grooves into which extend the edges of the hood members of a gear case (not shown).

In order to remove the gear rim from the gear center, the spring elements 8 must first be taken out and the gear rim then rotated far enough to bring the lugs 5 out of register with the lugs 7, as illustrated in Fig. 3. The springs 8 must be removed from the inner side of the gear wheel because the counter-balance 10 and flange 14 prevent access thereto from the outer side.

With the spring elements removed and the lugs on the gear rim out of register with those on the gear center, the gear rim is tilted off the gear center, as shown in Fig. 3, and lowered slightly to permit the lower portion thereof to clear the flange 14 of the gear center. The lower portion is then raised a short distance to permit the gear rim to be lifted off over the counter-balance.

In order to remove the gear rim, it is necessary only that the side rod be disconnected from the gear wheel and that the jack shaft, with the gear wheels carried thereby, be removed from the locomotive, but it is not necessary to remove the gear wheel from the jack shaft.

Various modifications may be made in the structure without avoiding the spirit of the invention, as defined in the accompanying claims.

I claim as my invention:—

1. In combination, in a gear wheel, a gear rim having inwardly extending lugs, a gear center having outwardly extending lugs, resilient elements interposed between the lugs of the gear rim and those of the gear center, and a counter-balance integral with the gear center and extending radially beyond the resilient elements, the counterbalance being of a form which permits the passage of the gear rim thereover.

2. In combination, in a gear wheel, a gear rim having inwardly extending lugs, a gear center having outwardly extending lugs, resilient elements interposed between the lugs of the gear rim and those of the gear center, and a counter-balance integral with the gear center and extending beyond the periphery of the gear center, the counter-balance being of a form which permits the passage of the gear rim thereover.

3. In combination, in a gear wheel, a gear rim having inwardly extending lugs, a gear center having outwardly extending lugs extending into the zone occupied by the inwardly extending lugs, resilient elements interposed between the lugs of the gear rim and those of the gear center, and a counter-balance integral with the gear center and extending beyond the periphery of the gear center, the counter-balance being of such form that the gear rim may be passed thereover.

4. In combination, in a gear wheel, a gear rim having inwardly extending lugs, a gear center having outwardly extending lugs, resilient elements interposed between the lugs of the gear rim and those of the gear center, and a counter-balance integral with the gear center and extending into the circumferential zone of the gear rim but the greatest dimension of which is less than the internal diameter of the gear rim.

5. In combination, in a gear wheel, a gear rim, a gear center, and a counter-balance integral with the gear center and extending radially beyond the inner face of the gear rim, the counterbalance being of such form as to permit the removal of the gear rim thereacross.

6. In combination, in a gear wheel, a gear rim, a gear center, and a counter-balance carried by the gear center and extending radially beyond the zone occupied by the internal face of the gear rim but the greatest dimension of which is less than the internal diameter of the gear rim.

7. In combination, in a wheel, a removable rim member, a hub member, and a counter-balance integral with the hub member and extending beyond the periphery thereof, the greatest dimension of the counter-balance being less than the internal diameter of the rim.

8. In combination, in a wheel, a removable rim member, a hub member, and a counter-balance integral with the hub member, and extending beyond the periphery thereof, the greatest dimension of the extended portion of the counter-balance being less than the internal diameter of the rim.

9. The combination with an axle, of a wheel mounted adjacent to one end thereof and comprising a removable rim member, a hub member, and a counter-balance integral with the hub member and extending to a point beyond the inner periphery of the rim member, the counter-balance being formed upon the outer side of the hub member and having its greatest dimension less than the inner diameter of the rim member, whereby the rim member may be passed thereover in removing it from the hub member.

In testimony whereof I have hereunto subscribed my name this 29th day of December, 1920.

GEORGE M. EATON.